United States Patent
Zampini, II et al.

(10) Patent No.: US 7,748,887 B2
(45) Date of Patent: Jul. 6, 2010

(54) POSITIVE LOCKING LIGHT FIXTURE WITH FACEPLATE

(75) Inventors: Thomas Zampini, II, Morris, CT (US); Thomas L. Zampini, Morris, CT (US); Mark A. Zampini, Morris, CT (US)

(73) Assignee: Integrated Illumination Systems, Inc., Morris, CT (US)

( * ) Notice: Subject to any disclaimer, the term of this patent is extended or adjusted under 35 U.S.C. 154(b) by 839 days.

(21) Appl. No.: 11/448,154

(22) Filed: Jun. 7, 2006

(65) Prior Publication Data
US 2007/0076441 A1 Apr. 5, 2007

Related U.S. Application Data

(60) Provisional application No. 60/721,998, filed on Sep. 30, 2005.

(51) Int. Cl.
*H01R 33/00* (2006.01)

(52) U.S. Cl. .................. 362/655; 362/147; 362/364; 362/374; 362/369; 362/390; 362/800; 362/375; 362/365

(58) Field of Classification Search ............. 362/644, 362/800, 147, 364, 365, 374, 375, 369, 390
See application file for complete search history.

(56) References Cited

U.S. PATENT DOCUMENTS

| 4,139,770 | A | | 2/1979 | Beyersdorf |
| 4,520,435 | A | * | 5/1985 | Baldwin ............... 362/311.04 |
| 5,465,199 | A | * | 11/1995 | Bray et al. ................ 362/364 |
| 6,443,592 | B1 | | 9/2002 | Unger et al. |
| 6,585,389 | B2 | * | 7/2003 | Bonazzi ..................... 362/147 |
| 6,929,379 | B2 | * | 8/2005 | Clemente et al. ............ 362/158 |
| 7,077,548 | B2 | * | 7/2006 | Basey ......................... 362/390 |
| 7,488,092 | B2 | * | 2/2009 | Mier-Langner et al. ..... 362/285 |

\* cited by examiner

*Primary Examiner*—Sandra L O'Shea
*Assistant Examiner*—Jessica L McMillan
(74) *Attorney, Agent, or Firm*—Choate Hall & Stewart LLP; Christopher J. McKenna

(57) ABSTRACT

An assembly has a faceplate having inwardly extending pins and a housing having holes for receiving said inwardly extending pins. Vibration resistant means is provided for locking the faceplate to the housing.

28 Claims, 3 Drawing Sheets

POSITIVE LOCKING LIGHT FIXTURE WITH FACEPLATE

RELATED APPLICATIONS

The present invention claims priority from Provisional Application No. 60/721,998, filed Sep. 30, 2005, entitled POSITIVE LOCKING LIGHT FIXTURE WITH FACEPLATE, the disclosure of which is hereby incorporated by reference in its entirety.

BACKGROUND OF THE INVENTION

1. Field of the Invention

The present invention relates generally to light fixtures and more specifically to light fixtures or assemblies wherein selectively removable features/elements are resistant to loosening/disconnection under the influence of vibration such as occurs in vehicles/vessels or vibration prone environments.

2. Description of the Related Art

To date, there are light fixtures available that that use a removable faceplate as a means of concealing fixture housing mounting screws. These faceplates typically include a decorated trim ring (i.e. painted or plated) and a glass window installed to the trim ring.

The faceplates typically mount by twisting the faceplates onto the light fixture where a dimple in the side of the faceplate rides a sloping track on the light fixture. The faceplate is held in place by friction as the dimple will need to slide back down the full length of this track in order to permit removal of the faceplate. While this mounting system may prove effective for installations under normal conditions, it presents several drawback when used in installations where shock and vibration are prevalent, such as marine applications (including commercial and recreational marine vessels of all sizes and marine platforms). Shock and vibration will eventually loosen up the faceplate such that it slides down the ramp and falls.

This presents several problems. In many instances a light fixture such as the one described is used in the ceiling or hardtop over a boat helm. If the faceplate does in fact fall from the fixture due to heavy shock and or vibration, there is the risk that of injury to the vessel operator and/or passengers. This will cause harm, distraction, and/or potential burns particularly when the faceplates are used on halogen based fixtures and can heat up to several hundred degrees.

A further problem resides in that often a red filter will be added to the glass for night operation. In this instance the white light is filtered so that red light is emitted preserving the vessel operator's night vision. Should the faceplate and filter fall from the fixture, the vessel operator may potentially be blinded from the bright white light from the filter-less fixture.

SUMMARY OF THE INVENTION

Embodiments of the present invention are directed to a faceplate which engages engagement elements in such a way that a positive lock is ensured. This positive lock allows the faceplate to be positioned against an assembly such as a light fixture or the like and turned until it clicks into a locked position. Once the faceplate clicks, removing it must be the intention of the user rather than being induced by environmental circumstances. The components involved are the faceplate and the features around the diameter of the assembly.

Faceplate:

In one embodiment of the invention, the faceplate is very similar to a standard light fixture faceplate used today. The faceplate may be made of any material including metal, plastic, composite, etc. Unlike conventional faceplates, rather than having dimples in the side of the faceplate, the present invention's faceplate has radially inward extending pins that point towards the center (axis) of the faceplate. The pins may be press fit pins that are pressed into the faceplate side. Alternatively, the pins may be molded, bonded, welded or any other method used for installing a pin shaped component to a surface.

In a further embodiment of the invention, the faceplate, as noted above, does not have a window (i.e. glass or similar transparent member) and the window is connected to the housing of light fixture, such that when the faceplate is removed, the window remains in place on the fixture. The glass in this embodiment can be retained via mechanical or adhesive retention depending on the application. Apart from reducing the weight of the faceplate, this feature also permits the ready interchange of one faceplate with another.

It should, however, be noted that the embodiments of the invention are not limited to this arrangement and the faceplate per se may be provided with the window in place of the housing. It is further within the purview of the invention to have both the housing and faceplate provided with windows. For example, the housing can be provided with a standard water white transparent window while the faceplate can be provided with a red colored window (for example) for use at night or the like.

Light Fixture:

The arrangement to which the face plate is connectable is, in at least one embodiment of the invention, very similar to a standard light fixture inasmuch as it comprises a light source and housing. Wires connect the light fixture to a power source. The light fixture may be manufactured from any suitable material including metal, plastic, and composite. The light fixture may be molded, stamped, machined, or manufactured using other viable methods. The light fixture in this instance, mounts via mounting holes in a housing face which in this embodiment comprises an annular flange or rim.

Positioning of the housing may be implemented using screws, bolts, or any other fastening devices. The fixture may also be bonded into place.

Embodiments of the invention may be mounted any way including bulkhead mounted, flush mounted or surface mounted.

In the illustrated embodiments, there are three pins on each faceplate. For each pin, there is a corresponding slot or pin entry point on the light fixture. For installation of the faceplate to the light fixture, the three pins are aligned and pressed up through the pin entry points. The faceplate is then rotated (clockwise for example). Note that there is a stop provided one side of the pin entry point such that the faceplate will not turn in the opposite direction (e.g. counter-clockwise) thus ensuring that the user installs the faceplate properly. As the faceplate is turned, the pins slide along associated resilient arm members applying a pressure thereto which deflects the arms by a predetermined amount. Once the pins reach a hook or recess formed at the ends of the arms, the pins seat in the recesses permitting some of the deflecting pressure to be released. This provides a "click" that verifies the faceplate is fully engaged and "locked" in position. The pins are now retained in the associated hooks and will require a given rotational force to disengage.

An optional feature to help maintain pressure between the faceplate and the light fixture are several bumps on the annular flange of the housing face.

In accordance with embodiments of the invention, the light fixture's window may be made from any material including glass, plastic, etc, is fastened to the light fixture rather than the faceplate. The window may be fastened to the light fixture by means of mechanical fastening including but not limited to a gasket system. It may also be fastened via adhesive in the case where relatively frequent bulb access is not required such as in the instance that an LED based fixture (>50,000 hour life) is used.

As the window is supported on/connected to the light fixture, the light fixtures may be sold with out the faceplate. End users will, in this instance, have the option to purchase a variety of faceplates of different shape, color, finish, texture etc. without compromising the structural integrity of the fixture.

While most any method of manufacturing from a variety of materials may be used, the present invention light fixture lends itself well to stamping, thus allowing the entire light fixture housing to be manufactured from a single sheet of metal, thus promoting low cost manufacturing.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE EXEMPLARY EMBODIMENTS

FIGS. 1-7 illustrate embodiments of the invention. For ease of explanation, terms such as "above", "below", "rearwardly" etc., are used and should be construed in a relative sense.

Figure 1:
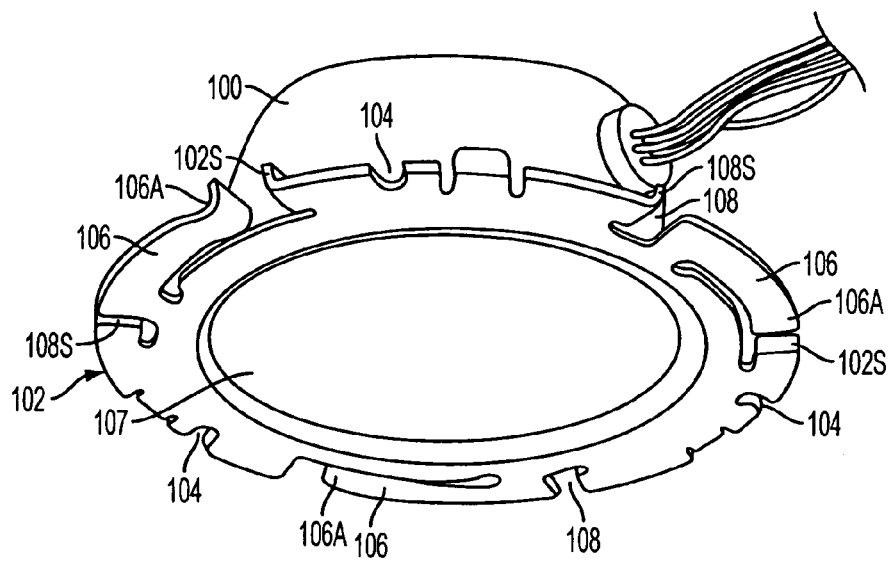
FIG. 1 is a perspective view of a housing according to a first exemplary embodiment of the invention as viewed from below.
Figure 2:
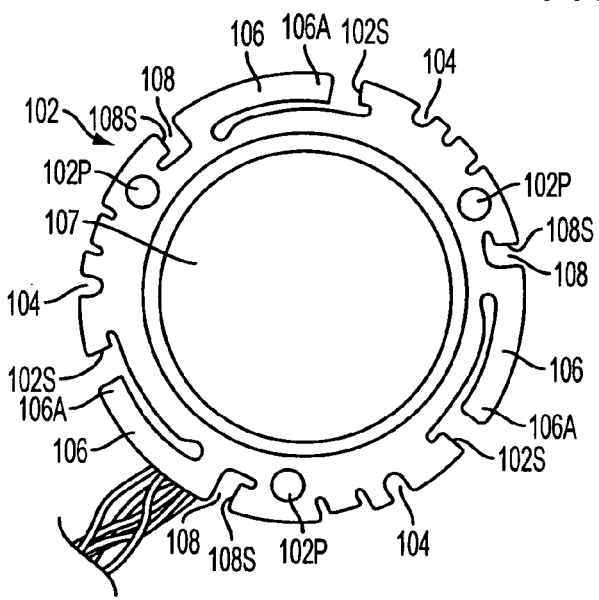
FIG. 2 is a plan view of the housing depicted in FIG. 1.
Figure 3:
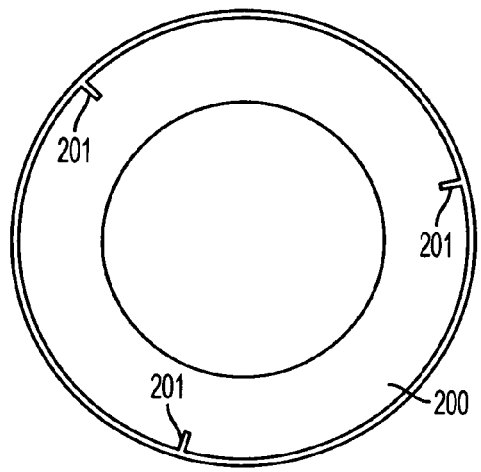
FIG. 3 is a plan view of a faceplate illustrating the disposition of pins which form part of the first embodiment.
Figure 4:
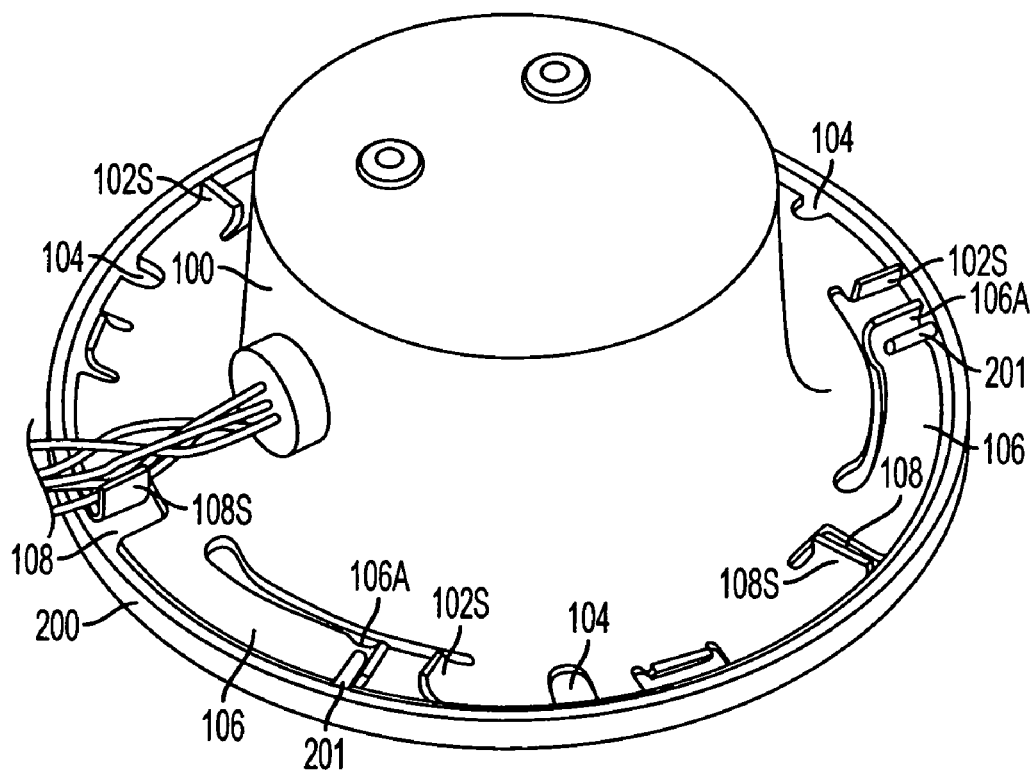
FIG. 4 is a perspective view as seen from above, of the housing and the faceplate according to the first embodiment assembled with one another.

Referring to FIGS. 1 and 2, in a first embodiment, a housing 100 is formed with an annular flange or rim 102. This rim or flange 102 is apertured so that a plurality of mounting openings 104 which facilitate the connecting of the housing to a panel such as a ceiling or overhead structure 101, are formed at predetermined intervals. A plurality, in this case three, resilient arms 106 are also defined. Each of these arms 106 are arcuately curved in the manner best appreciated from FIG. 2, and are formed with hook features 106A at the free ends thereof. These hook features 106A function as detent recesses as will become apparent hereinlater. Each arm 106 is bent so as to be angled upwardly slightly with respect to the plane of the annular rim 102 to produce a bias against which they can be flexed.

A window 107 of light transparent material is disposed in the mouth of the housing 100 to close off the interior and protect a light source, camera or the like which is disposed therein. This window 107 is connected to and supported in the housing 100 by features are which are not shown. A sealing gasket or ring of adhesive can also be used between the window 107 and housing 100, as the situation demands. The window 107 can be either clear, white or red or whatever color is deemed appropriate.

The faceplate 200 is formed with inwardly oriented projections such as pin 201. These pins 201 extend radially inward in the manner best seen in FIG. 4, and are configured to pass through apertures 108 formed immediately prior the formation of the flexible arms 106 so that the pins 201, once having passed therethrough can be moved, in accordance with the rotation of the faceplate 200 along the upper surfaces of the arms 106. As the pins traverse the upper surfaces of the arms 106, the arms are deflected downwardly until such time as the pins 201 reach the hook features 106A. At this time, the pins 201 seat in the recesses or detent recesses 106A as they will be referred to hereinafter, with an attendant release of some of the force which is deflecting the arms 106. This provides a "snap" which produces a tactile sensation to the person rotating the faceplate and imparts the knowledge that the pins have seated in the recesses and have assumed positions wherein the faceplate 200 is now locked to the housing 100.

Figure 5:
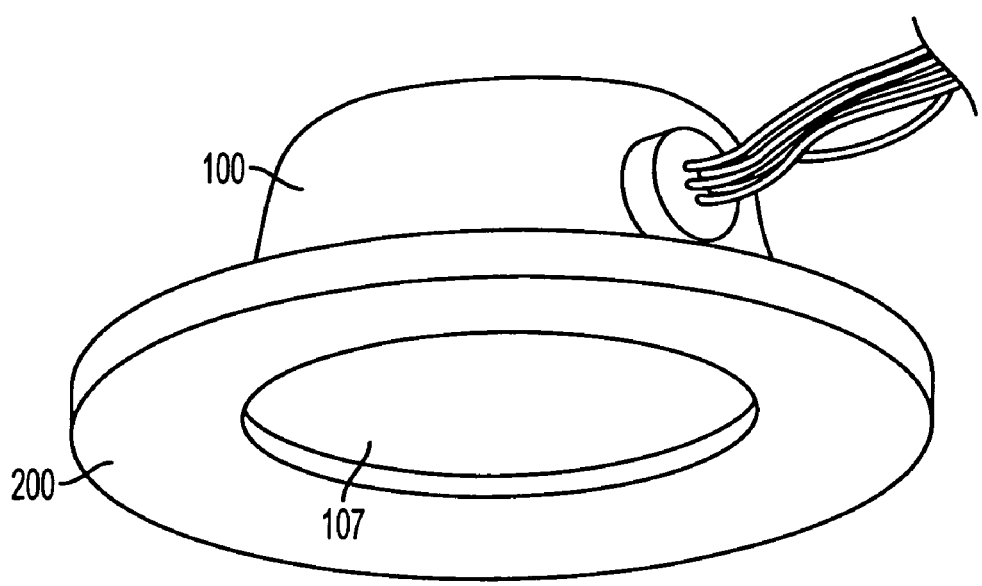
FIG. 5 is a perspective view as seen from below, of the housing and the faceplate according to the first embodiment assembled with one another.

The faceplate 200 when disposed in position on the housing 100 conceals the lower edge of the annular flange 102 and improves the aesthetic qualities of the arrangement in the manner best appreciated from FIG. 5.

The depth and configuration of the detent recesses 106A are selected to require an operator to apply a predetermined amount of torque to faceplate 200 before the pins 201 will ride up and out of the detent recesses 106A, deflect the arms 106 and be again slidable along the upper surfaces of the arms 106 toward the recesses 108. Upon reaching the recesses 108, the faceplate 200 can, of course, be removed from the housing 100.

In accordance with embodiments of the invention, inasmuch as the pins 201 are held in the detent recesses 106A by residual deflection of the arms, vibration is prevented from rattling the pins 201 loose and the faceplate 200 will remain securely connected to the housing 100 irrespective of the application of vibrational energy such as tends to be generated in vehicles and water born vessels. That is to say, vibration will not produce the torque that is necessary to achieve the release of the locking function provided by the seating of the pins 201 in the detent recesses 106A.

To facilitate proper connection of the faceplate to the housings, the flanges 102 can be formed with stopper members 108S on one side of the apertures 108 which inhibit the movement of the pins 201 in a direction which is opposite to that required to induce locking of the faceplate to the housing. Further stoppers 102S can be provided at locations opposite the detent recess portions of the arms 106 for the same purpose.

Figure 6:
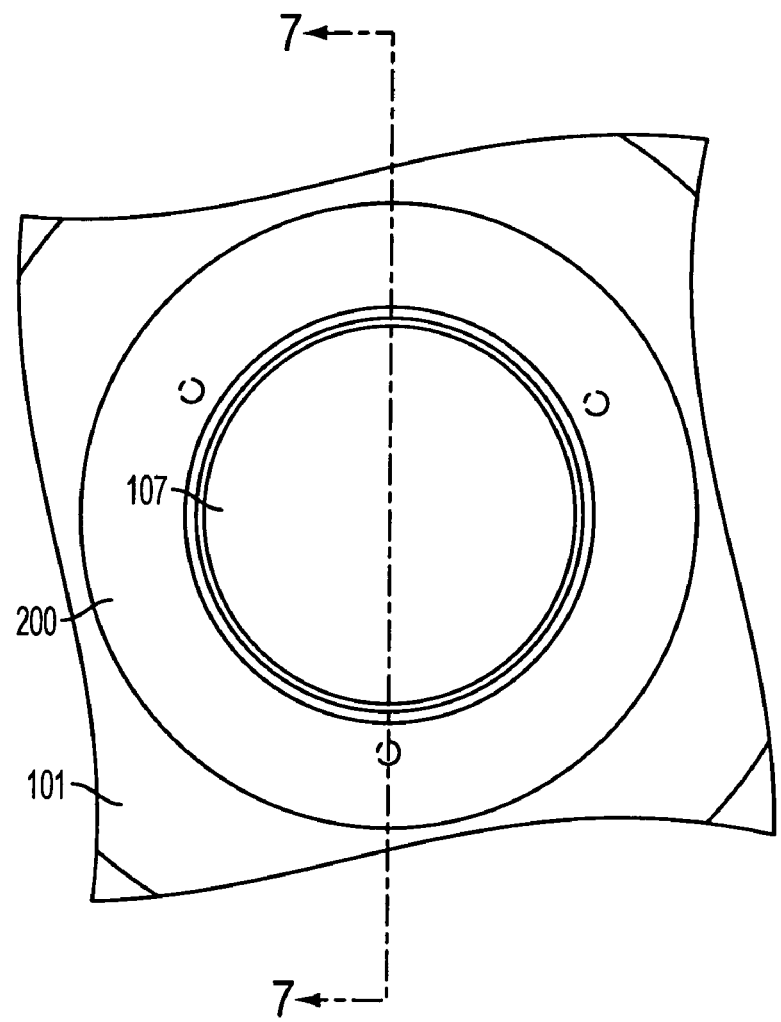
FIG. 6 is an underside plan view of the housing and the faceplate according to a second embodiment of the invention assembled together.

The illustrated embodiments of the invention are provided with three pins and three arms. FIG. 6 shows the position of the pins at 120° intervals. However, the invention is not limited to three, and more or less than three can be used. Further, in the first embodiment, shown in FIGS. 1-5, dome like protrusions or bumps 102P, are provided in the flange or rim 102. These bumps 102P are configured to engage an interior surface of the faceplate 100 and limit the degree by which the faceplate 100 can approach the flange 102. This assists in attenuating rattling occurring between the faceplate 100 and housing 200 by limiting the vertical movement of the pins 201 with respect to the upper surface of the flange 102.

Figure 7:
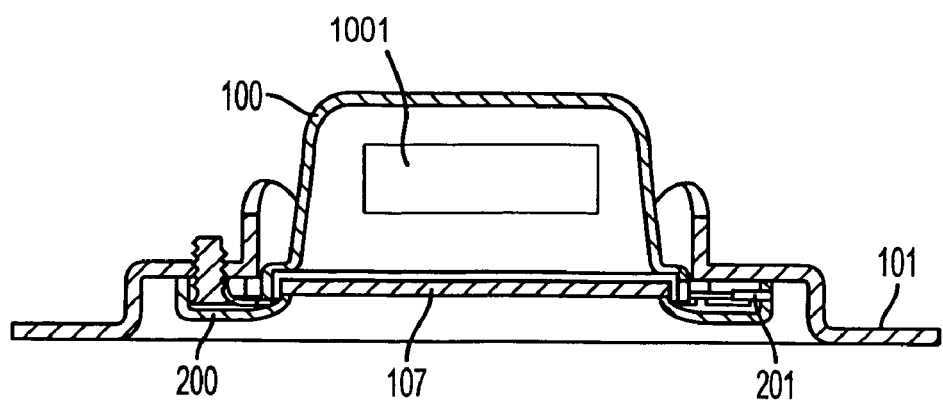
FIG. 7 is a sectional view of the arrangement depicted in FIG. 6, as taken along section line A-A of FIG. 6.

FIG. 7 illustrates a second embodiment of the invention. In this embodiment, a window is connected to and forms part of the faceplate 200. This embodiment facilitates easy access to the interior of the housing for maintenance or the like. By providing an elastomeric gasket about the outer peripheral edge of the faceplate, sealing between the faceplate and housing can be achieved.

In FIG. 7 a light source 1001 is schematically depicted within the housing 100. This light source can take the form of an LED (Light Emitting Diodes) lighting arrangement which is configured to produce white light or a plurality of different colors which can be mixed to produce different colors including white light.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

For example, while the embodiments of the invention have been described in connection with light fittings, the invention is not specifically limited thereto and can be applied to other assemblies where a vibration resistant connection is desirable.

What is claimed is:

1. An assembly comprising:
   a faceplate having inwardly extending pins;
   a housing having openings in a flange for receiving said inwardly extending pins; and
   vibration resistant means for locking the faceplate to the housing comprising:
   a plurality of arms defined in a plane of the flange facing the faceplate, each arm of the plurality of arms comprising a first portion curved away from the plane to apply increasing pressure against an inwardly extending pin slid along the first portion and a second portion forming a detent recess at the end of each arm for receiving the inwardly extending pin that is lockable within the detent recess by rotating the faceplate against the flange of the housing.

2. An assembly as set forth in claim 1, wherein the faceplate is essentially annular in configuration and is configured to conceal the inwardly extending pin receiving openings when locked to the housing.

3. An assembly as set forth in claim 2, wherein the inwardly extending pins extend radially inward with respect to an axis about which the annular faceplate is annular.

4. An assembly as set forth in claim 2, wherein the housing has an annular flange in which the locking means is configured and which further comprises a window disposed with the housing at a location inboard the annular flange.

5. An assembly as set forth in claim 4, wherein the annular faceplate conceals the annular flange when locked to the housing.

6. An assembly as set forth in claim 4, wherein the inboard edge of the faceplate juxtaposes the outer surface of the window.

7. An assembly as set forth in claim 1, wherein the plurality of arms are flexible, arcuate and angled upwardly from the plane of the flange;
   the detent recess in each arm is disposed at a free end of the arm; and
   the faceplate clicks into a locked position when an inwardly extending pin is received in a portion of the detent recess forming a hook for locking the inwardly extending pin slid along the arm and into the hook of the detent recess as the faceplate is rotated against the flange of the housing.

8. An assembly as set forth in claim 7, wherein the plurality of arms are configured to be resilient and to be deflected by a predetermined amount upon passage of the inwardly extending pins over the first portion of the arms and wherein the inwardly extending pins when seated in the detent recesses of the plurality of arms maintain a level of deflection of the arms which is less than the predetermined amount but sufficient to maintain secure contact between a surface portion of the detent recesses and the pins.

9. An assembly as set forth in claim 7, wherein a curvature of an outboard edge of each arm coincides with a perimeter of the annular flange.

10. An assembly as set forth in claim 1, wherein the assembly comprises a light fixture and each arm of the plurality of arms is angled upwardly from the plane of the flange.

11. An assembly as set forth in claim 10, wherein the light fixture comprises LED (light emitting diodes) as a light source.

12. An assembly as set forth in claim 11, wherein the LED are configured to produce white light.

13. An assembly as set forth in claim 11, wherein the LED are configured to produce a plurality of colors.

14. An assembly comprising:
    a housing configured to be secured to a structural panel, the housing comprising:
    an annular flange portion having a plurality of flexible arms defined in a plane of the flange facing a faceplate, and
    a plurality of openings each located immediately prior to a flexible arm and configured so that a pin can pass through an opening and then slide along an upper surface of a first portion of a flexible arm toward and into a detent recess of second portion of the flexible arm, the first portion curved away from the plane to apply increasing pressure against the pin slid along the first portion and the second portion forming the detent recess at the end of the flexible arm for receiving the pin; and
    the faceplate configured to cooperate with a portion of the housing in a manner which conceals the annular flange, the faceplate being provided with a plurality of pins configured to pass through the openings and slide along the upper surfaces of a respective flexible arm and be releasably captured in the detent recess, the pin locked within the detent recess by rotating the faceplate against the flange of the housing.

15. An assembly as set forth in claim 14, wherein a curvature of an outboard edge of each flexible arm corresponds to a perimeter of the annular flange.

16. An assembly as set forth in claim 14, wherein each flexible arm is angled out of the plane of the annular flange and the annular flange is formed with mounting openings through which fastening devices can be disposed to secure the housing to the structural panel.

17. An assembly as set forth in claim 14, further comprising a light transparent window configured to be supported by one of the housing and the faceplate.

18. An assembly as set forth in claim 17, wherein the window is connected to the housing so as to close an opening of the housing located within the annular flange and to isolate an interior of the housing.

19. An assembly as set forth in claim 17, wherein the assembly comprises a light fixture.

20. An assembly as set forth in claim 19, wherein the light fixture comprises LED (light emitting diodes) as a light source.

21. An assembly as set forth in claim 20, wherein the LED are configured to produce white light.

22. An assembly as set forth in claim, 20, wherein the LED are configured to produce a plurality of colors.

23. A light fixture assembly as set forth in claim 19, wherein an inner peripheral edge of the faceplate juxtaposes a peripheral edge portion of the window.

24. A light fixture assembly as set forth in claim 19, wherein the window is connected to and supported by the faceplate.

25. A method of securing a faceplate to a housing of an assembly comprising:
   inserting inwardly extending pins on the faceplate through openings in a flange on the housing;
   rotating the faceplate with respect to the housing and causing the inwardly extending pins to slide along respective surfaces of resilient arms in a manner which deflects the resilient arms by a predetermined amount, wherein the resilient arms are defined in a plane of the flange facing the faceplate, each of the resilient arms comprising a first portion curved away from the plane to apply increasing pressure against a corresponding inwardly extending pin slid along the first portion and a second portion forming a detent recess at the end of each of the resilient arms for receiving the corresponding inwardly extending pin; and
   seating the inwardly extending pins in detent recesses formed in the resilient arms to lock the faceplate in position on the housing as the faceplate is rotated against the flange of the housing.

26. A method as set forth in claim 25, wherein the faceplate is essentially annular and the pins extend radially inward with respect to an axis about which the faceplate is annular.

27. A method as set forth in claim 25, wherein the housing has an annular flange in which the resilient arms are defined.

28. A method as set forth in claim 25, wherein the openings in the housing are formed in the flange at locations immediately prior a position at which the resilient arms are connected to the flange.

* * * * *